US009956678B1

(12) United States Patent

Abu-Saleh

(10) Patent No.: US 9,956,678 B1
(45) Date of Patent: May 1, 2018

(54) RECHARGEABLE DRILL HAVING ROTATABLE PRONGS

(71) Applicant: Adnan Abu-Saleh, Shelton, WA (US)

(72) Inventor: Adnan Abu-Saleh, Shelton, WA (US)

( * ) Notice: Subject to any disclaimer, the term of this patent is extended or adjusted under 35 U.S.C. 154(b) by 400 days.

(21) Appl. No.: 14/835,039

(22) Filed: Aug. 25, 2015

(51) Int. Cl.
*B25F 5/02* (2006.01)
*H02J 7/02* (2016.01)
*H02J 7/00* (2006.01)

(52) U.S. Cl.
CPC .............. *B25F 5/02* (2013.01); *H02J 7/0042* (2013.01); *H02J 7/02* (2013.01)

(58) Field of Classification Search
CPC ................. H02J 7/00; H01R 4/50; B25F 5/02
USPC .................................. 173/217; 439/436, 188
See application file for complete search history.

(56) References Cited

U.S. PATENT DOCUMENTS 3,843,224 A * 10/1974 Gerke, Jr. ............ H01H 1/5866 439/350
4,976,173 A * 12/1990 Yang ......................... B25F 3/00 173/46
D314,698 S 2/1991 Zurwelle
5,354,215 A * 10/1994 Viracola .................. B25F 5/02 310/50
5,628,641 A * 5/1997 Hahn ..................... H01R 27/00 439/131
6,007,373 A * 12/1999 Chew ................. H01R 13/6675 439/500
6,104,162 A * 8/2000 Sainsbury ............. H02J 7/0057 320/107
D441,342 S 5/2001 Hatch
6,296,065 B1 10/2001 Carrier
6,573,621 B2 6/2003 Neumann
7,175,456 B2 * 2/2007 Moreno .................... B25F 5/00 439/248
7,625,228 B2 * 12/2009 Doumani ................ B25F 5/006 439/384
7,798,825 B1 * 9/2010 Pai ......................... H01R 31/06 439/131
8,366,461 B2 2/2013 Lee
2002/0182922 A1 * 12/2002 Rosa .................... H01R 13/639 439/352
2003/0011245 A1 1/2003 Fiebig
2007/0279000 A1 12/2007 Lucero
2010/0202137 A1 8/2010 Dalton
2011/0097911 A1 * 4/2011 Lee ........................ H01R 24/30 439/108
2011/0121782 A1 5/2011 Marsh
2013/0334898 A1 12/2013 Kao

* cited by examiner

*Primary Examiner* — Nathaniel Chukwurah
(74) *Attorney, Agent, or Firm* — Kyle A. Fletcher, Esq.

(57) ABSTRACT

The rechargeable drill having rotatable prongs is a cordless drill with a rechargeable battery. The rechargeable battery is accessible via a battery compartment cover, which is removable. The rechargeable battery is wired to a set of rotatable prongs. The set of rotatable prongs are located in a recess provided on a bottom surface of the cordless drill. The set of rotatable prongs are adapted to be inserted into a standard electrical outlet in order to recharge the rechargeable battery. The rechargeable battery provides electricity to a motor located inside of the rechargeable drill.

14 Claims, 5 Drawing Sheets

RECHARGEABLE DRILL HAVING ROTATABLE PRONGS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of cordless drills, more specifically, a cordless drill that is rechargeable, and includes rotatable prongs to connect with a standard electrical outlet.

SUMMARY OF THE INVENTION

The rechargeable drill having rotatable prongs is a cordless drill with a rechargeable battery. The rechargeable battery is accessible via a battery compartment cover, which is removable. The rechargeable battery is wired to a set of rotatable prongs. The set of rotatable prongs are located in a recess provided on a bottom surface of the cordless drill. The set of rotatable prongs are adapted to be inserted into a standard electrical outlet in order to recharge the rechargeable battery. The rechargeable battery provides electricity to a motor located inside of the rechargeable drill.

It is an object of the invention to provide a cordless drill with a set of rotatable prongs that are adapted to be inserted into a standard electrical outlet in order to recharge a rechargeable battery of the cordless drill as needed.

These together with additional objects, features and advantages of the rechargeable drill having rotatable prongs will be readily apparent to those of ordinary skill in the art upon reading the following detailed description of presently preferred, but nonetheless illustrative, embodiments of the rechargeable drill having rotatable prongs when taken in conjunction with the accompanying drawings.

In this respect, before explaining the current embodiments of the rechargeable drill having rotatable prongs in detail, it is to be understood that the rechargeable drill having rotatable prongs is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rechargeable drill having rotatable prongs.

It is therefore important that the claims be regarded as including such equivalent construction insofar as they do not depart from the spirit and scope of the rechargeable drill having rotatable prongs. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
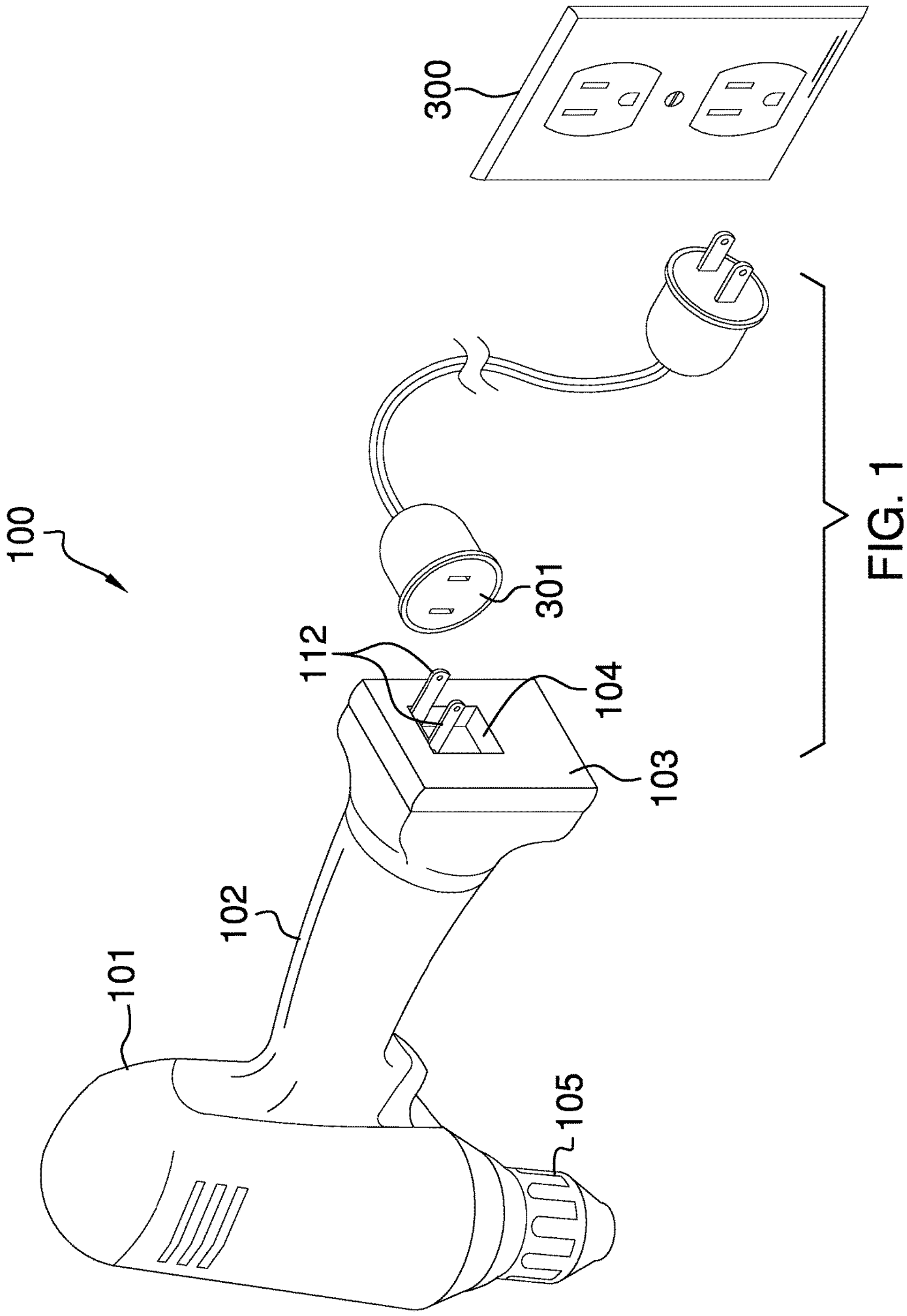
FIG. 1 is a perspective view of an embodiment of the disclosure.
Figure 2:
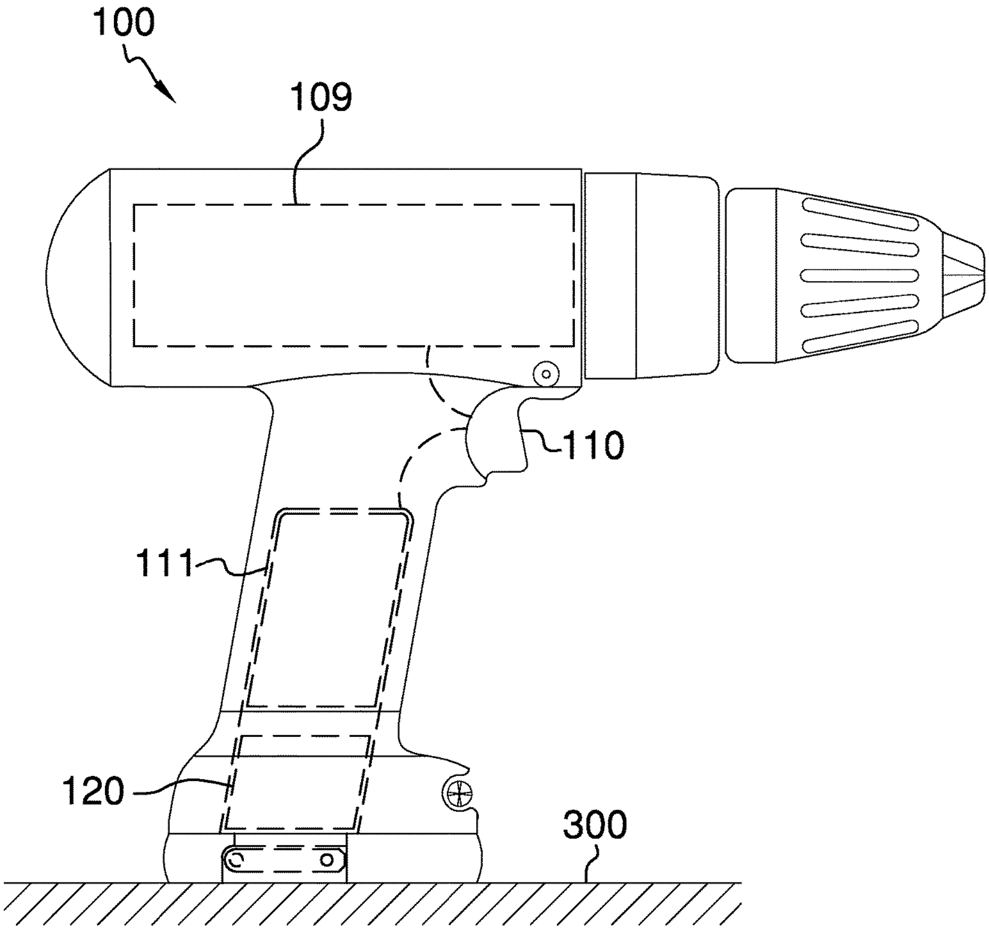
FIG. 2 is a front view of an embodiment of the disclosure.
Figure 3:
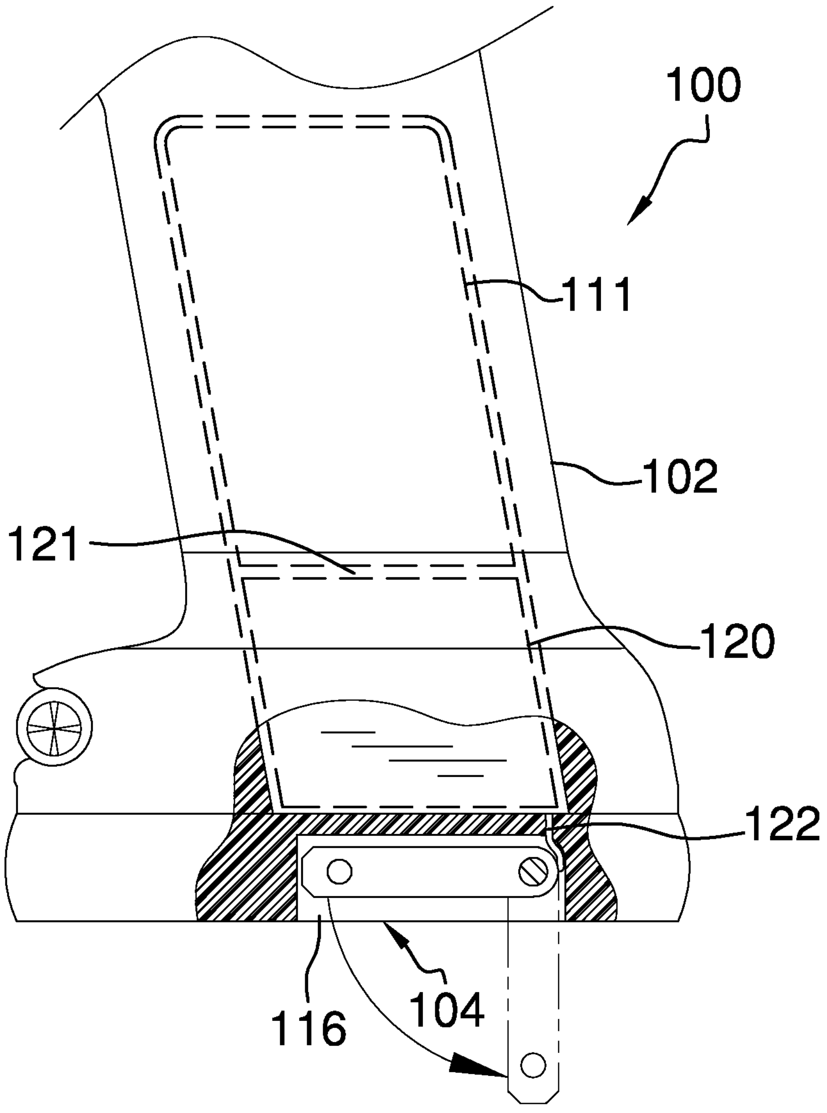
FIG. 3 is a detail, side view of an embodiment of the disclosure.
Figure 4:
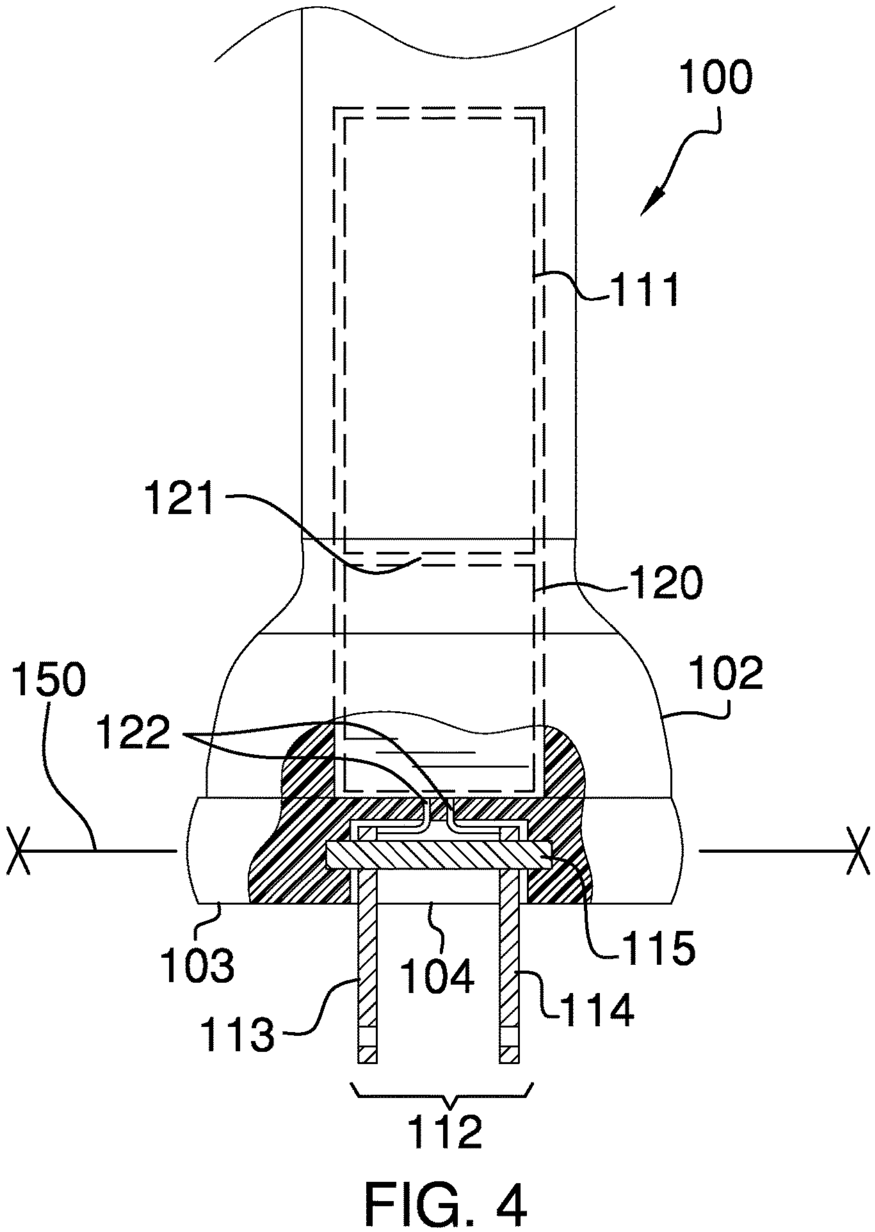
FIG. 4 is a detail, end view of an embodiment of the disclosure.
Figure 5:
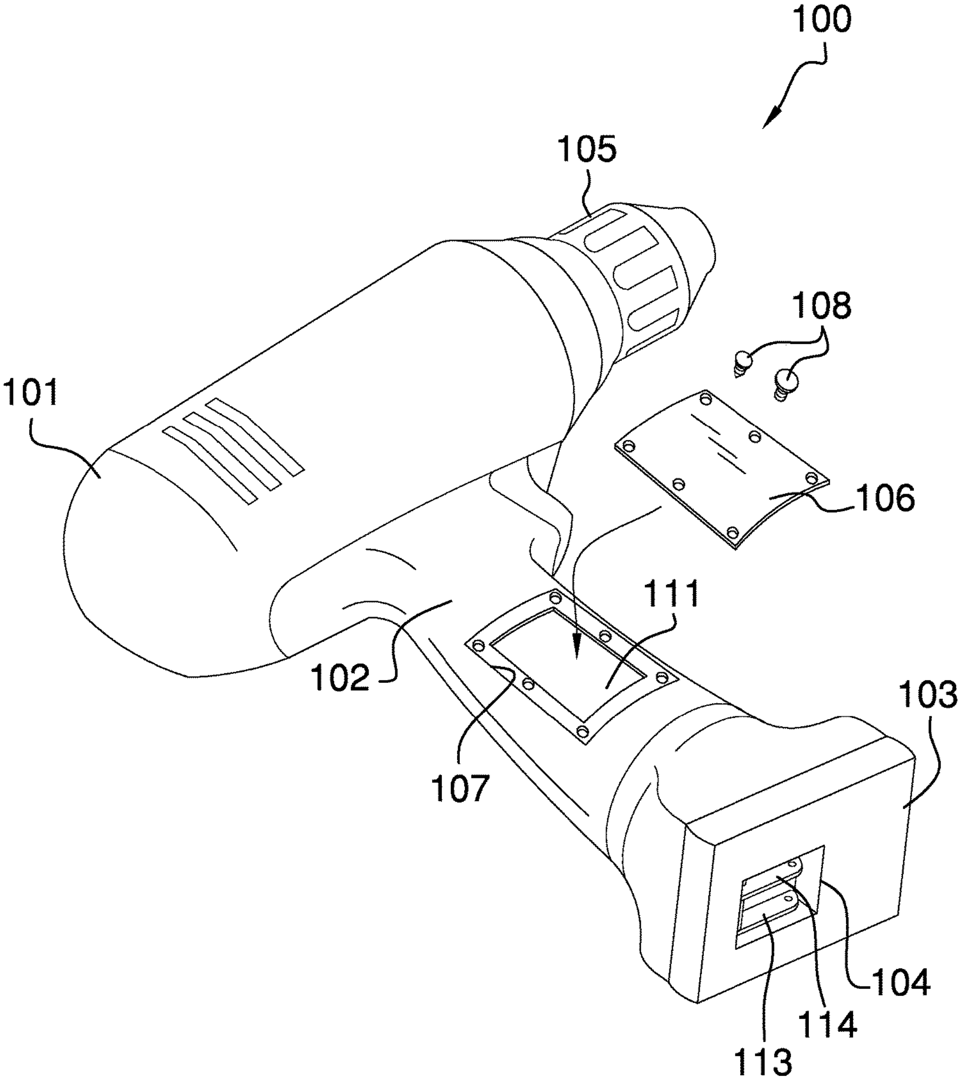
FIG. 5 is another perspective view of an embodiment of the disclosure.

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 5, the rechargeable drill having rotatable prongs 100 (hereinafter invention) generally comprises a drill housing 101 affixed to a drill handle 102. The drill handle 102 is further defined with a bottom surface 103. The bottom surface 103 is generally planar, and includes a recess 104 thereon. The bottom surface 103 is generally planar so as to enable the invention 100 to be placed on a flat surface 200. The drill housing 101 is affixed to the top of the drill handle 102. The drill housing 101 includes a drill chuck 105 that extends there from.

The drill housing 101 and the drill handle 102 are of hollowed construction. The drill handle 102 is adapted to be grasped via a user. Moreover, the drill handle 102 is further defined with a battery compartment cover 106, which is secured over a battery compartment 107 via at least one securing member 108. The securing member 108 being a screw or bolt.

The drill housing 101 encases a motor 109 that is in wired connection with a trigger 110. The trigger 110 is in wired connection with a rechargeable battery 111. The trigger 110 is mounted on the drill handle 102. The rechargeable battery 111 is positioned in the battery compartment 107. Moreover, the rechargeable battery 111 is enclosed within the battery compartment 107 via the battery compartment cover 106. The rechargeable battery 111 is in wired connection with a plurality of rotatable prongs 112. The motor 109 is in direct mechanical connection with the drill chuck 105, which is well known in the art.

The plurality of rotatable prongs 112 is provided in the recess 104 of the bottom surface 103 of the drill handle 102. The plurality of rotatable prongs 112 is further defined with a first prong 113 and a second prong 114. The first prong 113 and the second prong 114 are able to rotate via a pivot rod 115 located in the recess 104 of the drill handle 102. The pivot rod 115 is rigidly affixed to inner side surfaces 116 of the recess 104. The plurality of rotatable prongs 112 is able to rotate in concert from a flat position that is nested inside of the recess 104 to a fully extend position that is perpendicular with respect to the recess 104. The plurality of rotatable prongs 112 is able to pivot via the pivot rod 115 about a lateral axis 150. The lateral axis 150 is parallel with the bottom surface 103 of the drill handle 102.

The plurality of rotatable prongs 112 is adapted to be inserted into a standard electrical outlet 300 in order to access electricity that is used to recharge the rechargeable battery 111 encased within the drill handle 102. Referring to FIG. 1, the standard electrical outlet 300 may be connected to the invention 100 via an extension cord 301. Alternatively, the invention 100 may be plugged directly to the standard electrical outlet 300. Alternatively, the extension cord 301 and the standard electrical outlet 300 are plugged to the invention 100 in order to supply electricity that is used directly where the rechargeable battery 111 is exhausted, but the drill aspect of the invention 100 is needed.

The plurality of rotatable prongs 112 is wired directly to an AC/DC converter 120 that in turn is in wired connection with the rechargeable battery 111. The AC/DC converter 120 is used to transform the AC current into a DC current that the rechargeable battery 111 is able to use in order to recharge. A converter wire 121 extends from the AC/DC converter 120 to the rechargeable battery 111. A prong wire 122 extends from the plurality of rotatable prongs 112 to the AC/DC converter 120.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rechargeable drill having rotatable prongs comprising:

a plurality of rotatable prongs that are adapted to be connected to a standard electrical outlet in order to recharge a rechargeable battery and/or power a motor that drives a drill chuck;

wherein a drill housing is affixed to a drill handle;

wherein the drill handle is further defined with a bottom surface;

wherein the bottom surface is generally planar, and includes a recess thereon;

wherein the drill housing is affixed to the top of the drill handle;

wherein the drill housing includes the drill chuck that extends there from;

wherein the drill handle is further defined with a battery compartment cover, which is secured over a battery compartment via at least one securing member;

wherein the at least one securing member consists of a screw or bolt.

2. The rechargeable drill having rotatable prongs according to claim 1 wherein the drill housing encases the motor that is in wired connection with a trigger.

3. The rechargeable drill having rotatable prongs according to claim 2 wherein the trigger is in wired connection with the rechargeable battery.

4. The rechargeable drill having rotatable prongs according to claim 3 wherein the trigger is mounted on the drill handle.

5. The rechargeable drill having rotatable prongs according to claim 4 wherein the rechargeable battery is positioned in the battery compartment; wherein the rechargeable battery is enclosed within the battery compartment via the battery compartment cover.

6. The rechargeable drill having rotatable prongs according to claim 5 wherein the rechargeable battery is in wired connection with the plurality of rotatable prongs.

7. The rechargeable drill having rotatable prongs according to claim 6 wherein the plurality of rotatable prongs is provided in the recess of the bottom surface of the drill handle.

8. The rechargeable drill having rotatable prongs according to claim 7 wherein the plurality of rotatable prongs is further defined with a first prong and a second prong.

9. The rechargeable drill having rotatable prongs according to claim 8 wherein the first prong and the second prong are able to rotate via a pivot rod located in the recess of the drill handle.

10. The rechargeable drill having rotatable prongs according to claim 9 wherein the pivot rod is rigidly affixed to inner side surfaces of the recess.

11. The rechargeable drill having rotatable prongs according to claim 10 wherein the plurality of rotatable prongs is able to rotate in concert from a flat position that is nested inside of the recess to a fully extend position that is perpendicular with respect to the recess.

12. The rechargeable drill having rotatable prongs according to claim 11 wherein the plurality of rotatable prongs is able to pivot via the pivot rod about a lateral axis; wherein the lateral axis is parallel with the bottom surface of the drill handle.

13. The rechargeable drill having rotatable prongs according to claim 12 wherein the plurality of rotatable prongs is wired directly to an AC/DC converter that in turn is in wired connection with the rechargeable battery;

wherein the AC/DC converter is used to transform the AC current into a DC current that the rechargeable battery is able to use in order to recharge.

14. The rechargeable drill having rotatable prongs according to claim 13 wherein a converter wire extends from the AC/DC converter to the rechargeable battery; wherein a prong wire extends from the plurality of rotatable prongs to the AC/DC converter.

* * * * *